(12) United States Patent
Alvez-Manoli et al.

(10) Patent No.: US 12,473,498 B2
(45) Date of Patent: Nov. 18, 2025

(54) IN-REACTOR ACTIVATION OF A HIGH CHLORIDE AROMATIZATION CATALYST

(71) Applicant: Chevron Phillips Chemical Company LP, The Woodlands, TX (US)

(72) Inventors: Gabriela D. Alvez-Manoli, Kingwood, TX (US); Stephen L. Kelly, Kingwood, TX (US); Amanda B. Allemand, Spring, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 28 days.

(21) Appl. No.: 18/297,680

(22) Filed: Apr. 10, 2023

(65) Prior Publication Data

US 2024/0336850 A1 Oct. 10, 2024

(51) Int. Cl.
*C10G 11/05* (2006.01)
*B01J 29/62* (2006.01)
*B01J 37/02* (2006.01)
*B01J 37/18* (2006.01)

(52) U.S. Cl.
CPC ............... *C10G 11/05* (2013.01); *B01J 29/62* (2013.01); *B01J 37/0236* (2013.01); *B01J 37/18* (2013.01); *B01J 2229/40* (2013.01); *C10G 2400/30* (2013.01)

(58) Field of Classification Search
CPC ....... C10G 11/05; C10G 2400/30; B01J 37/18
See application file for complete search history.

(56) References Cited

U.S. PATENT DOCUMENTS

| | | |
|---|---|---|
| 4,159,938 A | 7/1979 | Lewis |
| 4,456,527 A | 6/1984 | Buss |
| 4,539,305 A | 9/1985 | Wilson |
| 4,568,656 A | 2/1986 | Poeppelmeier |
| 4,717,700 A | 1/1988 | Venkatram |
| 5,066,632 A | 11/1991 | Baird, Jr. |
| 5,382,353 A | 1/1995 | Mulaskey |
| 5,389,235 A | 2/1995 | Russ |
| 5,401,365 A | 3/1995 | Chen |
| 5,410,386 A | 4/1995 | Swift |
| 5,716,515 A | 2/1998 | Innes |

(Continued)

FOREIGN PATENT DOCUMENTS

WO 2018118604 A1 6/2018

OTHER PUBLICATIONS

International Search Report and Written Opinion issued in corresponding PCT Application No. PCT/US2024/023530, mailed on Jun. 24, 2024, 9 pp.

(Continued)

*Primary Examiner* — Prem C Singh
*Assistant Examiner* — Ming Cheung Po
(74) *Attorney, Agent, or Firm* — Merchant & Gould P.C.

(57) ABSTRACT

Processes for activating a high-chlorine content aromatization catalyst in a reactor system include the steps of contacting the aromatization catalyst with an inert gas stream in the reactor system at a drying temperature of 300-400° C. to form a treated catalyst, and then contacting the treated catalyst with a reducing gas stream in the reactor system to form an activated catalyst. Subsequently, a hydrocarbon feed can be contacted with the activated catalyst under reforming conditions in the reactor system to produce an aromatic product.

11 Claims, 5 Drawing Sheets

(56) References Cited

U.S. PATENT DOCUMENTS

| | | | |
|---|---|---|---|
| 5,914,028 | A | 6/1999 | Wilson |
| 6,190,539 | B1 | 2/2001 | Holtermann |
| 6,207,042 | B1 | 3/2001 | Holtermann |
| 6,406,614 | B1 | 6/2002 | Tiedtke |
| 6,518,470 | B1 | 2/2003 | Fukunaga |
| 6,812,180 | B2 | 11/2004 | Fukunaga |
| 7,153,801 | B2 | 12/2006 | Wu |
| 7,932,425 | B2 | 4/2011 | Blessing |
| 9,718,042 | B2 | 8/2017 | Demmelmaier |
| 10,556,228 | B2 | 2/2020 | Alvez-Manoli |
| 2013/0231511 | A1* | 9/2013 | Wu ............... B01J 37/24 585/407 |
| 2014/0213839 | A1* | 7/2014 | Wu ............... B01J 29/62 585/419 |
| 2018/0065115 | A1* | 3/2018 | Alvez-Manoli ....... B01J 27/12 |
| 2018/0333705 | A1 | 11/2018 | Snell |
| 2018/0333713 | A1 | 11/2018 | Alvez |
| 2019/0247833 | A1 | 8/2019 | Snell |
| 2019/0249091 | A1 | 8/2019 | Snell |
| 2019/0249094 | A1 | 8/2019 | Snell |
| 2019/0336951 | A1 | 11/2019 | Snell |
| 2020/0139354 | A1 | 5/2020 | Alvez |
| 2020/0239387 | A1 | 7/2020 | Snell |
| 2020/0338532 | A1 | 10/2020 | Snell |

OTHER PUBLICATIONS

Brunauer et al. "Adsorption of Gases in Multimolecular Layers," Journal of the American Chemical Society, 60 (2):309-319, 1938, doi:10.1021/ja01269a023.

\* cited by examiner

IN-REACTOR ACTIVATION OF A HIGH CHLORIDE AROMATIZATION CATALYST

FIELD OF THE INVENTION

The present disclosure concerns methods for startup and activation of supported aromatization catalysts, and more particularly relates to performing such methods within an aromatization or reforming reactor system.

BACKGROUND OF THE INVENTION

The catalytic conversion of non-aromatic hydrocarbons into aromatic compounds, often referred to as aromatization or reforming, is an important industrial process that can be used to produce benzene, toluene, xylenes, and the like. The aromatization or reforming process often is conducted in a reactor system that can contain one or more reactors containing platinum based catalysts, which can increase the selectivity to and/or the yield of the desired aromatic compounds. However, the methods in which these catalysts are initially brought up to operating conditions through drying methods and subsequent activating methods prior to the introduction of feed hydrocarbons can impact their catalytic performance.

It would be beneficial to have drying and activating methods that result in improved catalyst activity in aromatization or reforming processes. Accordingly, it is to this end that the present disclosure is generally directed.

SUMMARY OF THE INVENTION

Processes for activating a supported aromatization catalyst in a reactor system are disclosed and described herein. Such processes can comprise (a) contacting the supported aromatization catalyst with an inert gas stream in the reactor system at a drying temperature in a range from 300° C. to 400° C. to form a treated catalyst, and (b) contacting the treated catalyst with a reducing gas stream in the reactor system to form an activated catalyst. The supported aromatization catalyst can comprise a bound zeolite base, from 0.3 wt. % to 3 wt. % of platinum, from 1.8 wt. % to 4 wt. % of chlorine, and from 0.4 wt. % to 1.5 wt. % of fluorine. The supported aromatization catalyst contains a relatively high loading of chlorine.

The supported aromatization catalysts can be used in aromatization processes to produce aromatic compounds from alkanes and cycloalkanes. Therefore, a reforming process provided herein can comprise (i) contacting a supported aromatization catalyst with an inert gas stream in a reactor system at a drying temperature in a range from 300° C. to 400° C. to form a treated catalyst, (ii) contacting the treated catalyst with a reducing gas stream in the reactor system to form an activated catalyst, and (iii) contacting a hydrocarbon feed with the activated catalyst under reforming conditions in the reactor system to produce an aromatic product. As above, the supported aromatization catalyst has a relatively high chloride content, and can comprise a bound zeolite base, from 0.3 wt. % to 3 wt. % of platinum, from 1.8 wt. % to 4 wt. % of chlorine, and from 0.4 wt. % to 1.5 wt. % of fluorine.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and processes are often described in terms of "comprising" various components or steps, the compositions and processes also can "consist essentially of" or "consist of" the various components or steps, unless stated otherwise. The terms "a," "an," and "the" are intended to include plural alternatives, e.g., at least one, unless otherwise specified.

Generally, groups of elements are indicated using the numbering scheme indicated in the version of the periodic table of elements published in *Chemical and Engineering New,* 63(5), 27, 1985. In some instances, a group of elements can be indicated using a common name assigned to the group: for example, alkali metals for Group 1 elements, transition metals for Group 3-12 elements, and halogens or halides for Group 17 elements.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to hexane includes n-hexane, 2-methyl-pentane, 3-methyl-pentane, 2,2-dimethyl-butane, and 2,3-dimethtl-butane; and a general reference to a butyl group includes a n-butyl group, a sec-butyl group, an iso-butyl group, and a t-butyl group.

In one aspect, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific methods or procedures, unless specified otherwise or the context requires otherwise.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that the supported aromatization catalysts can contain from 1.8 wt. % to 4 wt. % of chlorine, based on the total weight of the catalyst. By a disclosure that the chlorine content of the supported aromatization catalyst can be in a range from 1.8 wt. % to 4 wt. %, the intent is to recite that the chlorine content can be any amount within the range and, for example, can include any range or combination of ranges from 1.8 wt. % to 4 wt. %, such as from 2 wt. % to 3.8 wt. %, from 2.2 wt. % to 3.6 wt. %, from 2.2 wt. % to 3.4 wt. %, from 2.2 wt. % to 3 wt. %, or from 2.5 wt. % to 3.3 wt. %, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

As used herein, the term "hydrocarbon" refers to a compound containing only carbon and hydrogen atoms. Other identifiers can be utilized to indicate the presence of particular groups, if any, in the hydrocarbon (e.g., halogenated hydrocarbon indicates the presence of one or more halogen atoms replacing an equivalent number of hydrogen atoms in the hydrocarbon).

An "aromatic" compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds, e.g., benzene, toluene, and xylenes) and "heteroarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)). As disclosed herein, the term "substituted" can be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers can be utilized to indicate the presence of particular groups, if any, in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group can be linear or branched unless otherwise specified.

A "cycloalkane" is a saturated cyclic hydrocarbon, with or without side chains, for example, cyclobutane, cyclopentane, cyclohexane, methyl cyclopentane, and methyl cyclohexane. Other identifiers can be utilized to indicate the presence of particular groups, if any, in the cycloalkane (e.g., halogenated cycloalkane indicates the presence of one or more halogen atoms replacing an equivalent number of hydrogen atoms in the cycloalkane).

As used herein, the term "convertible hydrocarbon," "convertible $C_6$ species," or "convertible $C_7$ species" refers to a hydrocarbon compound that is readily reacted to form aromatic hydrocarbons under aromatization process conditions. A "non-convertible hydrocarbon" is a highly-branched hydrocarbon that is not readily reacted to form aromatic hydrocarbons under aromatization process conditions. A "non-convertible hydrocarbon" can comprise highly-branched hydrocarbons having six or seven carbon atoms with an internal quaternary carbon, or hydrocarbons having six carbons atoms and two adjacent internal tertiary carbons, or mixtures thereof. A "convertible $C_6$ species" is a hydrocarbon containing six carbons without an internal quaternary carbon or two adjacent internal tertiary carbons, for example, n-hexane, 2-methyl-pentane, 3-methyl-pentane, cyclohexane, and methyl cyclopentane. A "convertible $C_7$ species" is a hydrocarbon containing seven carbons without an internal quaternary carbon, for example, n-heptane, 2-methyl-hexane, 3-methyl-hexane, 2,3-dimethyl-pentane, 2,4-dimethyl-pentane, methyl cyclohexane, and dimethyl cyclopentane. The highly branched hydrocarbons with six or seven carbon atoms and an internal quaternary carbon can comprise, for example, 2,2-dimethylbutane, 2,2-dimethyl-pentane, 3,3-dimethylpentane, and 2,2,3-trimethylbutane. The highly branched hydrocarbons with six carbon atoms and an adjacent internal tertiary carbon can comprise, for example, 2,3-dimethylbutane. The non-convertible highly branched hydrocarbons do not easily convert to aromatic products and instead tend to convert to light hydrocarbons under aromatization process conditions.

The term "halogen" has its usual meaning. Examples of halogens include fluorine, chlorine, bromine, and iodine.

Molar selectivities are defined as:

$$\text{Benzene selectivity: } S_{Bz} = \frac{\dot{n}_{Bz,prod}}{\dot{n}_{conv\ C6,feed} - \dot{n}_{conv\ C6,prod}} \quad \text{Eq. 1}$$

$$\text{Toluene selectivity: } S_{Tol} = \frac{\dot{n}_{Tol,prod}}{\dot{n}_{conv\ C7,feed} - \dot{n}_{conv\ C7,prod}} \quad \text{Eq. 2}$$

Benzene + Toluene selectivity: 
$$S_{Bz+Tol} = \frac{\dot{n}_{Bz,prod} + \dot{n}_{Tol,prod}}{\dot{n}_{conv\ C6,C7,feed} - \dot{n}_{conv\ C6,C7,prod}} \quad \text{Eq. 3}$$

Aromatics selectivity: 
$$S_{arom} = \frac{\dot{n}_{Bz,prod} + \dot{n}_{Tol,prod} + \dot{n}_{C8+arom,prod}}{\dot{n}_{conv\ C6-C8+,feed} - \dot{n}_{conv\ C6-C8+,prod}} \quad \text{Eq. 4}$$

Conversion is defined as the number of moles converted per mol of "convertible" hydrocarbons fed:

C6 conversion: 
$$X_{C6} = \frac{\dot{n}_{conv\ C6,feed} - \dot{n}_{conv\ C6,prod}}{\dot{n}_{conv\ C6,feed}} \quad \text{Eq. 5}$$

C7 conversion: 
$$X_{C7} = \frac{\dot{n}_{conv\ C7,feed} - \dot{n}_{conv\ C7,prod}}{\dot{n}_{conv\ C7,feed}} \quad \text{Eq. 6}$$

C6 + C7 conversion: $X_{C6+C7} =$ Eq. 7
$$\frac{\dot{n}_{conv\ C6,feed} + \dot{n}_{conv\ C7,feed} - \dot{n}_{conv\ C6,prod} - \dot{n}_{conv\ C7,prod}}{\dot{n}_{conv\ C6,feed} + \dot{n}_{conv\ C7,feed}}$$

In these equations, $\dot{n}$ indicates a molar flow rate in a continuous reactor or the number of moles in a batch reactor.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which may be used in connection with the presently described invention.

DETAILED DESCRIPTION OF THE INVENTION

Disclosed herein are methods for drying and activating supported aromatization catalysts in an aromatization or reforming reactor system. Platinum, chlorine, and fluorine are impregnated onto a bound zeolite base, followed by drying and calcining to form the supported aromatization catalyst. However, not all of the water/moisture and nitrogen/ammonia are removed during the drying and calcining step utilized to form the supported aromatization catalyst. For instance, even after drying and calcining during catalyst preparation, the supported aromatization catalyst often can contain 0.5-1.4 wt. % nitrogen (N).

Further, after manufacture, the supported aromatization catalyst can absorb moisture during storage and shipment to a facility in which the reactor system resides. While the supported catalyst is typically packaged into drums after the calcining step, it can be stored in these drums for an extended period of time prior to shipment and subsequent loading into the aromatization reactor system. Moreover, the mere process of loading the supported aromatization catalyst into the reactors in the reactor system also results in additional absorption of moisture.

Conventional drying steps prior to activation (reduction) often can be successful in reducing the water/moisture content of the catalyst to an acceptable level, however, it was unexpectedly found that the removal of nitrogen/ammonia from the catalyst requires a higher temperature than conventional drying used to remove only water/moisture. These issues are compounded for aromatization catalysts that have a higher chloride content, which also have higher nitrogen/ammonia contents.

Beneficially, the processes disclosed herein for drying and activating the supported "high chloride" aromatization catalysts successfully remove significant amounts of both water/moisture and nitrogen/ammonia, resulting in an active (reduced) catalyst having unexpectedly improved catalytic reforming activity.

Activation and Reforming Processes

Aspects of this invention are directed to a process for activating a supported aromatization catalyst in a reactor system. A first process disclosed herein can comprise (or consist essentially of, of consist of) (a) contacting the supported aromatization catalyst with an inert gas stream in the reactor system at a drying temperature in a range from 300° C. to 400° C. to form a treated catalyst, and (b) contacting the treated catalyst with a reducing gas stream in the reactor system to form an activated catalyst. The supported aromatization catalyst in step (a) can comprise a bound zeolite base, from 0.3 wt. % to 3 wt. % of platinum, from 1.8 wt. % to 4 wt. % of chlorine, and from 0.4 wt. % to 1.5 wt. % of fluorine. The weight percentages are based on the total weight of the supported aromatization catalyst.

Aspects of this invention also are directed to reforming processes. A second process disclosed herein can comprise (or consist essentially of, or consist of) (i) contacting a supported aromatization catalyst with an inert gas stream in a reactor system at a drying temperature in a range from 300° C. to 400° C. to form a treated catalyst, (ii) contacting the treated catalyst with a reducing gas stream in the reactor system to form an activated catalyst, and (iii) contacting a hydrocarbon feed with the activated catalyst under reforming conditions in the reactor system to produce an aromatic product. The supported aromatization catalyst in step (i) can comprise a bound zeolite base, from 0.3 wt. % to 3 wt. % of platinum, from 1.8 wt. % to 4 wt. % of chlorine, and from 0.4 wt. % to 1.5 wt. % of fluorine. The weight percentages are based on the total weight of the supported aromatization catalyst.

Generally, the features of any of the processes herein (e.g., the bound zeolite base, the composition of the aromatization catalyst, the inert gas stream, the drying temperature, the reducing gas stream, the hydrocarbon feed, the conditions under which the drying step (or purging step) are conducted, the conditions under which the activation step (or reducing step) are conducted, and the reforming conditions in the reactor system, among others) are independently described herein, and these features can be combined in any combination to further describe the disclosed processes. Moreover, other process steps can be conducted before, during, and/or after any of the steps listed in the disclosed processes, unless stated otherwise.

The first process and the second process can be performed in any reactor systems suitable for catalytic reforming or aromatization. Representative reactor systems are described, for example, in U.S. Pat. Nos. 4,456,527, 5,389,235, 5,401,386, 5,401,365, 6,207,042, 7,932,425, and 9,718,042.

Referring now to step (a) of the first process and step (i) of the second process, which are often referred to as the drying step or the purging step, the supported aromatization catalyst can be contacted with an inert gas stream in the reactor system at a drying temperature in a range from 300° C. to 400° C. to form a treated catalyst. The supported aromatization catalyst in step (a)—which contains a relatively high loading of chlorine—can be produced by any technique known to those skilled in the art, such as described in U.S. Pat. No. 10,556,228, for example. Generally, the bound zeolite base can be produced by a process comprising mixing or combining a zeolite with a binder precursor, such as a silica sol, to form a mixture, then extruding the mixture to form an extrudate, followed by drying and calcining the extrudate to form a bound calcined base, and then washing, drying, and calcining the calcined base to form the bound zeolite base. In an impregnation step, the bound zeolite base can be contacted with a platinum precursor, a chlorine precursor, and a fluorine precursor to form an impregnated zeolite base, which is dried (e.g., vacuum dried) and then calcined to produce the supported aromatization catalyst.

In step (a) and step (i), the supported aromatization catalyst can be contacted with an inert gas stream comprising (or consisting essentially, or consisting of) any suitable inert gas, such as helium, neon, argon, nitrogen, or a combination thereof. Thus, the inert gas stream can comprise (or consist essentially of, or consist of) nitrogen; alternatively, helium; alternatively, neon; or alternatively, argon. Often, the inert gas stream is a nitrogen gas stream, largely due to widespread availability and low cost.

The drying step (or purging step) generally can be conducted at a drying temperature in a range from 300° C. to about 400° C. In one aspect, the drying temperature can be in a range from 315° C. to 385° C., while in another aspect, the drying temperature can range from 330° C. to 375° C., and in yet another aspect, the drying temperature can range from 340° C. to 370° C. In these and other aspects, these temperature ranges also are meant to encompass circumstances where the drying step is conducted at a series of different temperatures, instead of at a single fixed temperature, falling within the respective ranges. Step (a) and step (i) can be conducted at atmospheric pressure or in any suitable pressure range, such as from 0 psig to 100 psig, from 5 psig to 75 psig, or from 10 psig to 50 psig, although not limited thereto. The duration of the drying step is not limited to any particular period of time. Typically, the drying step can be conducted in a time period ranging from as little as 1 hr to as long as 72 hr (or more), but more typically, the drying step can be conducted in a time period that can be in a range from 3 hr to 72 hr, from 2 hr to 48 hr, from 2 hr to 24 hr, or from 6 hr to 36 hr, and the like.

Referring now to step (b) and step (ii), the treated catalyst can be contacted with a reducing gas stream in the reactor system to form an activated catalyst (also referred to as a reduced catalyst). Step (b) and step (ii) also can be referred to as the activating step or the reducing step. Any suitable temperatures, pressures, time periods, and reducing gas atmospheres can be used in the activating step.

Typical peak reducing temperatures often fall within a range from 200° C. to 600° C., from 250° C. to 550° C., from 450° C. to 525° C., or from 500° C. to 550° C., and the like. In these and other aspects, these temperature ranges also are meant to encompass circumstances where the activating step is conducted at a series of different temperatures (e.g., an initial reducing temperature, a peak reducing temperature), instead of at a single fixed temperature, falling within the respective ranges. For instance, the activating step can start at an initial temperature which is the same as the drying temperature in step (a) or step (i), and subsequently, the temperature of the reduction/activation can be increased over time to a peak reducing temperature, for example, in a range from 450° C. to 525° C., or from 500° C. to 550° C. Alternatively, as discussed further hereinbelow, the treated catalyst can be cooled prior to the reduction/activation.

The duration of the activating step—step (b) and step (ii)—is not limited to any particular period of time. Hence, the activating step can be conducted, for example, in a time period ranging from as little as 1 hr to as long as 48-72 hr, or more. Generally, the activating step can be conducted in a time period that can be in a range from 1 hr to 72 hr, from 3 hr to 72 hr, from 2 hr to 48 hr, from 2 hr to 24 hr, or from 6 hr to 36 hr, and the like. Similar to the drying step, step (b) and step (ii) can be conducted at atmospheric pressure or in any suitable pressure range, such as from 0 psig to 100 psig, from 5 psig to 75 psig, or from 10 psig to 50 psig, although not limited thereto.

Often, the reducing gas stream comprises molecular hydrogen, either alone or with an inert gas, such as helium, neon, argon, nitrogen, and the like, and this includes combinations of two or more of these inert gasses. In certain aspects, the reducing gas stream can comprise (or consist essentially of, or consist of) molecular hydrogen and nitrogen. Moreover, molecular hydrogen can be any relative amount of the reducing gas stream, with representative ranges for the amount of hydrogen in the reducing gas stream including from 10 to 100 vol %, from 10 to 75 vol %, from 45 to 75 vol %, and the like. Often, the amount of hydrogen is increased from an initial amount to the desired amount mentioned above over a period of minutes to hours depending on the size of the catalyst bed. The initial amount of hydrogen in the reducing gas stream may be as low as 1 vol %, as low as 5 vol %, as low as 10 vol %, and the like. In another aspect, the reducing gas stream can comprise (or consist essentially of, or consist of) molecular hydrogen and hydrocarbons.

It can be advantageous for the inert gas stream and/or the reducing gas stream to be substantially free of water/moisture, and/or substantially free of oxygen, and/or substantially free of sulfur, e.g., contain less than or equal to 750 ppm, independently, of water/moisture, oxygen, and sulfur based on the weight of the respective gas stream. For instance, the inert gas stream, or the reducing gas stream, or both can contain less than or equal to 750 ppm: less than or equal to 500 ppm: less than or equal to 100 ppm; less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of water/moisture, based on the weight of the respective gas stream feed. Additionally or alternatively, the inert gas stream, or the reducing gas stream, or both can contain less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of oxygen, based on the weight of the respective gas stream. Additionally or alternatively, the inert gas stream, or the reducing gas stream, or both can contain less than or equal to 750 ppm: less than or equal to 500 ppm: less than or equal to 100 ppm: less than or equal to 50 ppm: less than or equal to 25 ppm: less than or equal to 5 ppm; from greater than zero to 750 ppm, 500 ppm, 100 ppm, 50 ppm, 25 ppm, or 5 ppm; from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm; of sulfur, based on the weight of the respective gas stream.

Moreover, the inert gas stream can be substantially free of molecular hydrogen, e.g., can contain less than or equal to 750 ppm of molecular hydrogen. Thus, for instance, the inert gas stream can contain less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of molecular hydrogen, based on the weight of the inert gas stream.

Consistent with aspects of this invention, the first process and the second process can further comprise a step of cooling the treated catalyst after step (a) and before step (b)—or after step (i) and before step (ii)—to any suitable temperature. For instance, in this cooling step, the temperature can be reduced to a temperature within a range of from 150° C. to 280° C. in one aspect, from 180° C. to 270° C. in another aspect, and from 200° C. to 260° C. in yet another aspect. Any suitable cooling rate can be used, and cooling can be accomplished, for instance, by simply removing heat from the process. Optionally, there can a hold period after cooling that can last from 10 min (or 30 min) up to 1 hr (or 4 hr) prior to the reducing step.

In some aspects, the step of cooling the treated catalyst can be performed in any suitable inert gas. The inert gas can be the same as or different from the inert gas stream used in step (a) (or used in step (i)). In other aspects, the step of cooling the treated catalyst can be performed in a mixture of an inert gas and oxygen (e.g., air) or a mixture of an inert gas and a reducing gas. Typically, although not required, this latter mixture can contain nitrogen and molecular hydrogen. For instance, the mixture of the inert gas and the reducing gas can be the same as or different from the reducing gas stream used in step (b) (or used in step (ii)).

After the cooling step, the (cooled) treated catalyst is contacted with a reducing gas stream to form the activated catalyst. As discussed herein, the reducing gas stream can comprise (or consist essentially of, or consist of) molecular hydrogen and nitrogen, and the amount of hydrogen in the reducing gas stream can range from 10 to 100 vol %, from 10 to 75 vol %, or from 45 to 75 vol %, and the like. Often, the amount of hydrogen in the reducing gas stream is increased from an initial amount to the desired amount mentioned above over a period of minutes to hours depending on the size of the catalyst bed. The initial amount of hydrogen in the reducing gas stream may be as low as 1 vol %, as low as 5 vol %, as low as 10 vol %, and the like.

Referring now to the second process (the reforming process) and, in particular, step (iii), a hydrocarbon feed is contacted with the activated catalyst (after the drying/purging step and the activating/reducing step) under reforming conditions in the reactor system to produce an aromatic product. Typical reactor systems for reforming and the respective reforming conditions are described, for example, in U.S. Pat. Nos. 4,456,527, 5,389,235, 5,401,386, 5,401,365, 6,207,042, 7,932,425, 9,718,042, and 10,556,228. While not being limited thereto, representative aromatization or reforming reaction conditions include a reaction temperature in a range from 350° C. to 600° C., or from 400° C. to 550° C., and a reaction pressure in a range from 20 to 100 psig, or from 25 to 75 psig. Typical molar conversions of the alkanes and cycloalkanes to the aromatic hydrocarbons in the reactor system can range from 10 to 95%, from 50% to 90%, or from 70% to 85%.

Likewise, typical hydrocarbon feeds are disclosed in these references. Often, the hydrocarbon feed can be a naphtha stream or light naphtha stream. In certain aspects, the hydrocarbon feed can comprise alkanes and cycloalkanes, for example, the hydrocarbon feed can comprise $C_6$-$C_9$ alkanes and/or cycloalkanes, or $C_6$-$C_8$ alkanes and/or cycloalkanes (e.g., hexane, heptane, cyclohexane), and the like.

Typically, the hydrocarbon feed may be substantially free of sulfur, nitrogen, metals, and other poisons for reforming catalysts. For instance, the hydrocarbon feed can contain less than or equal to 750 ppm: less than or equal to 100 ppm: less than or equal to 50 ppm: less than or equal to 25 ppm: less than or equal to 5 ppm: from greater than zero to 750 ppm, 100 ppm, 50 ppm, 25 ppm, or 5 ppm: from 0.1 ppm to 750 ppm, 100 ppm, 50 ppm, 25 ppm, or 5 ppm; or from 2 ppm to 750 ppm, 100 ppm, 50 ppm, 25 ppm, or 5 ppm; of sulfur, based on the weight of the hydrocarbon feed. Additionally or alternatively, the hydrocarbon feed can contain less than or equal to 750 ppm: less than or equal to 100 ppm; less than or equal to 50 ppm: less than or equal to 25 ppm: less than or equal to 5 ppm: from greater than zero to 750 ppm, 100 ppm, 50 ppm, 25 ppm, or 5 ppm: from 0.1 ppm to 750 ppm, 100 ppm, 50 ppm, 25 ppm, or 5 ppm; or from 2 ppm to 750 ppm, 100 ppm, 50 ppm, 25 ppm, or 5 ppm: of nitrogen, based on the weight of the hydrocarbon feed. Additionally or alternatively, the hydrocarbon feed can contain less than or equal to 750 ppm: less than or equal to 100 ppm: less than or equal to 50 ppm: less than or equal to 25 ppm: less than or equal to 5 ppm: from greater than zero to 750 ppm, 100 ppm, 50 ppm, 25 ppm, or 5 ppm: from 0.1 ppm to 750 ppm, 100 ppm, 50 ppm, 25 ppm, or 5 ppm; or from 2 ppm to 750 ppm, 100 ppm, 50 ppm, 25 ppm, or 5 ppm: of metals, based on the weight of the hydrocarbon feed.

If present, such poisons can be removed using methods known to those skilled in the art. In some aspects, the feed can be purified by first using conventional hydrofining techniques, then using sorbents to remove the remaining poisons, as is known to those of skill in the art. Such hydrofining techniques and sorbents may be part of the improved catalytic reforming process described herein.

Generally, after activating in step (ii), step (iii) is typically commenced without further treatment of the activated catalyst. As an example, the activated catalyst in the second process is not contacted with an inert gas composition or a non-reducing gas composition between step (ii) and step (iii), and in particular, the activated catalyst in the second process is not contacted with an inert gas composition or a non-reducing gas composition at an elevated temperature, such as above 400° C., above 500° C., or ranging from 535° C. up to 750° C., between step (ii) and step (iii).

Consistent with aspects of this invention, after activating in step (ii), the second process can further comprise a step of cooling the activated catalyst after step (ii) and before step (iii) to any suitable temperature. For instance, in this cooling step, the temperature can be reduced by from 3° C. to 60° C. in one aspect, from 5° C. to 50° C. in another aspect, from 10° C. to 40° C. in yet another aspect, and from 10° C. to 30° C. in still another aspect, from the peak reducing temperature. This cooling step can be conducted in the same atmosphere as that of the reducing gas stream, or a different reducing atmosphere that can contain molecular hydrogen and an inert gas, such as nitrogen.

Supported Catalysts

Consistent with aspects disclosed herein are supported aromatization catalysts comprising (or consisting essentially of, or consisting of) a bound zeolite base, from 0.3 wt. % to 3 wt. % of platinum, from 1.8 wt. % to 4 wt. % of chlorine, and from 0.4 wt. % to 1.5 wt. % of fluorine. These weight percentages are based on the total weight of the supported aromatization catalyst.

The bound zeolite base (or the supported aromatization catalyst, or the treated catalyst, or the activated catalyst) can comprise a bound zeolite. Typically, the bound zeolite base (or the supported aromatization catalyst, or the treated catalyst, or the activated catalyst) can comprise an amorphous inorganic oxide that acts to bind together the medium and/or large pore zeolites (aluminosilicates), as well as mixtures thereof. Large pore zeolites often have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often have average pore diameters in a range of from about 5 Å to about 7 Å. The amorphous inorganic oxides can include, but are not limited to, aluminum oxide (alumina), silicon oxide (silica), titania, and combinations thereof.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically can be balanced by the inclusion of cations within the crystal, such as metals, alkali metals, and/or hydrogen.

In an aspect, the bound zeolite base (or the supported aromatization catalyst, or the treated catalyst, or the activated catalyst) can comprise an L-type zeolite. L-type zeolite supports are a sub-group of zeolitic supports, which can contain mole ratios of oxides in accordance with the formula: $M_{2/n}OAl_2O_{3x} SiO_{2y}H_2O$. In this formula, "M" designates an exchangeable cation (one or more) such as barium, calcium, cerium, lithium, magnesium, potassium, sodium, strontium, and/or zinc, as well as non-metallic cations like hydronium and ammonium ions, which can be replaced by other exchangeable cations without causing a substantial alteration of the basic crystal structure of the L-type zeolite. The "n" in the formula represents the valence of "M": "x" is 2 or greater; and "y" is the number of water molecules contained in the channels or interconnected voids of the zeolite.

In an aspect, the bound zeolite base (or the supported aromatization catalyst, or the treated catalyst, or the activated catalyst) can comprise a bound potassium L-type zeolite, also referred to as a K/L-zeolite. As used herein, the term "K/L-zeolite" refers to L-type zeolites in which the principal cation M incorporated in the zeolite is potassium In the bound zeolite base, the zeolite can be bound with a support matrix (or binder), and non-limiting examples of binders can include, but are not limited to, inorganic solid oxides. The zeolite can be bound with the binder or support matrix using any method known in the art. For instance, the bound zeolite base can be produced by a process comprising mixing a zeolite, such as a K/L-zeolite, with a binder precursor, such as a silica sol, then extruding the mixture to form an extrudate, followed by drying and calcining the extrudate to form a calcined base, and then washing, drying, and calcining the calcined base to form the bound zeolite base.

In some aspects, the binder can comprise alumina, silica, magnesia, boria, titania, zirconia, or a mixed oxide thereof (e.g., an aluminosilicate), or a combination thereof. In a particular aspect contemplated herein, the binder can comprise silica, alumina, or a mixed oxide thereof. Accordingly, the bound zeolite base (and therefore, the supported aromatization catalyst, or the treated catalyst, or the activated catalyst) can comprise a silica-bound L-zeolite or a silica-bound K/L-zeolite.

While not being limited thereto, the bound zeolite base (or the supported aromatization catalyst, or the treated catalyst, or the activated catalyst) can comprise from about 3 wt. % to about 35 wt. % binder. For example, the bound zeolite base (or the supported aromatization catalyst, or the treated catalyst, or the activated catalyst) can comprise from about 5 wt. % to about 30 wt. %, or from about 10 wt. % to about 30 wt. % binder. These weight percentages are based on the total weight of the bound zeolite base, or based on the total weight of the respective catalyst, as the context requires. Illustrative examples of bound zeolite bases and their use in supported catalysts are described, for instance, in U.S. Pat. Nos. 5,196,631, 6,190,539, 6,406,614, 6,518,470, 6,812,180, and 7,153,801.

The supported aromatization catalyst (or the treated catalyst, or the activated catalyst) can contain from 0.3 wt. % to 3 wt. % of platinum. Other suitable platinum contents include from 0.5 wt. % to 2.5 wt. %, from 0.5 wt. % to 2 wt. %, from 0.7 wt. % to 1.5 wt. %, and the like. These weight percentages of platinum are based on the total weight of the respective catalyst. In a particular aspect contemplated herein, the supported aromatization catalyst (or the treated catalyst, or the activated catalyst) can comprise platinum on a bound K/L-zeolite.

Beneficially, high loadings of chlorine in the supported aromatization catalyst can provide improved catalyst activity and catalyst stability, and lower fouling rates. Thus, the supported aromatization catalysts described herein have a relatively high loading of chlorine (Cl), generally ranging from 1.8 wt. % to 4 wt. % of chlorine, based on the total weight of the supported aromatization catalyst. In one aspect, the supported aromatization catalyst can contain from 2 wt. % to 3.8 wt. % chlorine. In another aspect, the supported aromatization catalyst can contain from 2.2 wt. % to 3.6 wt. % chlorine, or from 2.2 wt. % to 3.4 wt. % chlorine. In yet another aspect, the supported aromatization catalyst can contain from 2.2 wt. % to 3 wt. % chlorine. In still another aspect, the supported aromatization catalyst can contain from 2.5 wt. % to 3.3 wt. % chlorine.

The supported aromatization catalyst also can contain from 0.4 wt. % to 1.5 wt. % of fluorine (F), based on the total weight of the supported aromatization catalyst. For instance, the supported aromatization catalyst can contain from 0.5 wt. % to 1.3 wt. % fluorine, from 0.5 wt. % to 1.1 wt. % fluorine, or from 0.6 wt. % to 0.9 wt. % fluorine. While not being limited thereto, the supported aromatization catalyst can be characterized by a weight ratio of chlorine:fluorine that often falls within a range from 1.5:1 to 8:1. In some aspects, the weight ratio of chlorine:fluorine can range from 2:1 to 5:1, while in other aspects, the weight ratio can range from 3:1 to 4.5:1.

While not limited thereto, the supported aromatization catalyst often contains nitrogen (N) in an amount that can range from 0.5 wt. % to 1.4 wt. %, based on the total weight of the supported aromatization catalyst. Typical ranges for the amount of nitrogen can include, but are not limited to, from 0.6 wt. % to 1.3 wt. % nitrogen, from 0.7 wt. % to 1.2 wt. % nitrogen, and the like.

After the drying step and the activating step, the amount of chlorine on the catalyst often drops. For instance, the treated catalyst or the activated catalyst can contain from 0.30 wt. % to 2.3 wt. % chlorine; alternatively, from 0.30 wt. % to 2 wt. % chlorine; or alternatively, from 0.35 wt. % to 1.7 wt. % chlorine. These amounts of chlorine are based on the total weight of the respective catalyst. Nitrogen also can be present on the treated catalyst and the activated catalyst at amounts ranging from 0.05 wt. % to 0.7 wt. % N, such as from 0.1 wt. % to 0.6 wt. % N, or from 0.1 wt. % to 0.5 wt. % N. These amounts of nitrogen are based on the total weight of the respective catalyst.

In an aspect, the supported aromatization catalyst (or the treated catalyst, or the activated catalyst) can be substantially free of barium, e.g., can contain less than or equal to 750 ppm of barium. Thus, for instance, the supported aromatization catalyst (or the treated catalyst, or the activated catalyst) can contain less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of barium, based on the weight of the weight of the respective catalyst. Thus, in this aspect, the catalyst does not utilize a bound barium ion-exchanged zeolite, such as a bound barium ion-exchanged L-zeolite.

In an aspect, the supported aromatization catalyst (or the treated catalyst, or the activated catalyst) can be substantially free of transition metals other than platinum—contains less than or equal to 750 ppm of transition metals other than platinum (e.g., iridium and rhenium). For example, the supported aromatization catalyst (or the treated catalyst, or the activated catalyst) can contain less than or equal to 750 ppm: less than or equal to 500 ppm; less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of transition metals other than platinum, based on the weight of the respective catalyst. Additionally or alternatively, the supported aromatization catalyst (or the treated catalyst, or the activated catalyst) can be substantially free of sulfur, e.g., contains less than or equal to 750 ppm of sulfur. For instance, the supported aromatization catalyst (or the treated catalyst, or the activated catalyst) can contain less than or equal to 750 ppm: less than or equal to 500 ppm; less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of sulfur, based on the weight of the respective catalyst.

While not being limited thereto, the supported aromatization catalyst (or the treated catalyst, or the activated catalyst) can be characterized by a BET surface area that generally ranges from 100 m$^2$/g to 300 m$^2$/g, such as from 100 m$^2$/g to 200 m$^2$/g, or from 110 m$^2$/g to 170 m$^2$/g. Surface areas are determined using the Brunauer, Emmett, and Teller ("BET") method, described in Brunauer, Stephen: Emmett, P. H.: Teller, Edward (1938), "Adsorption of Gases in Multimolecular Layers," Journal of the American Chemical Society, 60 (2): 309-319, doi: 10.1021/ja01269a023.

The platinum dispersions of the treated catalysts or the activated catalysts in the processes disclosed herein often can range from 60% to 80%. In one aspect, for example, the platinum dispersion can be in a range from 60% to 75%, while in another aspect, the platinum dispersion can be in a range from 62% to 75%, and in yet another aspect, the platinum dispersion can be in a range from 62% to 72%. Platinum dispersion is determined by CO Chemisorption.

Importantly, the performance of the activated catalysts disclosed herein in aromatization reactions is improved. These supported catalysts have surprisingly higher catalyst activity and stability, as quantified by the $T_{SOR}$ (start of run temperature) and the $T_{EOR}$ (end of run temperature) metrics demonstrated in the examples that follow. Generally, the activated catalyst produced by the processes described herein can have a lower 40-hr $T_{SOR}$ and/or a lower 40-hr $T_{EOR}$ than that of an otherwise identical catalyst in which step (a) or step (i) is performed at a temperature of less than 275° C., and evaluated under the same 40-hr aromatization reaction conditions. Thus, the comparison is for the same supported aromatization catalyst (having the same platinum, fluorine, chlorine, and other compositional attributes). The only difference is the high temperature drying step of step (a) or step (i) as compared to a lower temperature drying step, i.e., at less than 275° C., such as at ~260° C.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Weight percentages of Pt. Cl, F, and N were determined using X-ray fluorescence (XRF), and are based on the total weight of the supported aromatization catalyst, unless stated otherwise. Platinum dispersion was determined by CO Chemisorption.

The evolution of water and ammonia during drying was determined using a Micromeritics AutoChem II Catalyst Characterization System in conjunction with an MKS Cirrus 2 Residual Gas Analyser (RGA) equipped with a quadrupole mass sensitive detector (MSD). A weighed portion of sample was placed in a quartz sample tube and placed in the AutoChem II 2920 under a flow of an inert gas (optionally argon or nitrogen) at 30 mL/min. The sample was heated from about 40° C. to 550° C. at 10° C./min, and the gases that evolved were swept along with the inert gas to a thermal conductivity detector (TCD) in the AutoChem II 2920 and to the MSD in the Cirrus 2 RGA. By combining data from the AutoChem II and the Cirrus 2, the fragment ions generated in the MSD were assigned to gases evolving from the sample as a function of temperature. For the data presented in FIG. 1, FIG. 2, and FIG. 3, the samples were heated from ambient temperature to 550° C. at 10° C./min under a flow of 30 mL/min Argon (Ar).

Examples A-C

Example A was a bound zeolite base (a standard bound K/L-zeolite base consisting of approximately 17 wt. % silica binder), and bound zeolite base A was used as the base material for all supported aromatization catalysts. Reference catalyst B was produced by impregnating bound zeolite base A with approximately 1 wt. % Pt, 0.85 wt. % Cl, and 0.6 wt. % F via incipient wetness techniques by (1) contacting the bound zeolite base with an aqueous solution containing platinum tetraammonium chloride (Pt(NH$_3$)$_4$Cl$_2$·xH$_2$O), ammonium chloride, and ammonium fluoride, (2) drying at 95° C., and (3) calcining at 300° C. to form the supported reference catalyst B. High chlorine content catalyst C was prepared in a manner similar to reference catalyst B, except that the chlorine loading of catalyst C was 2.5 wt. %.

Figure 1:
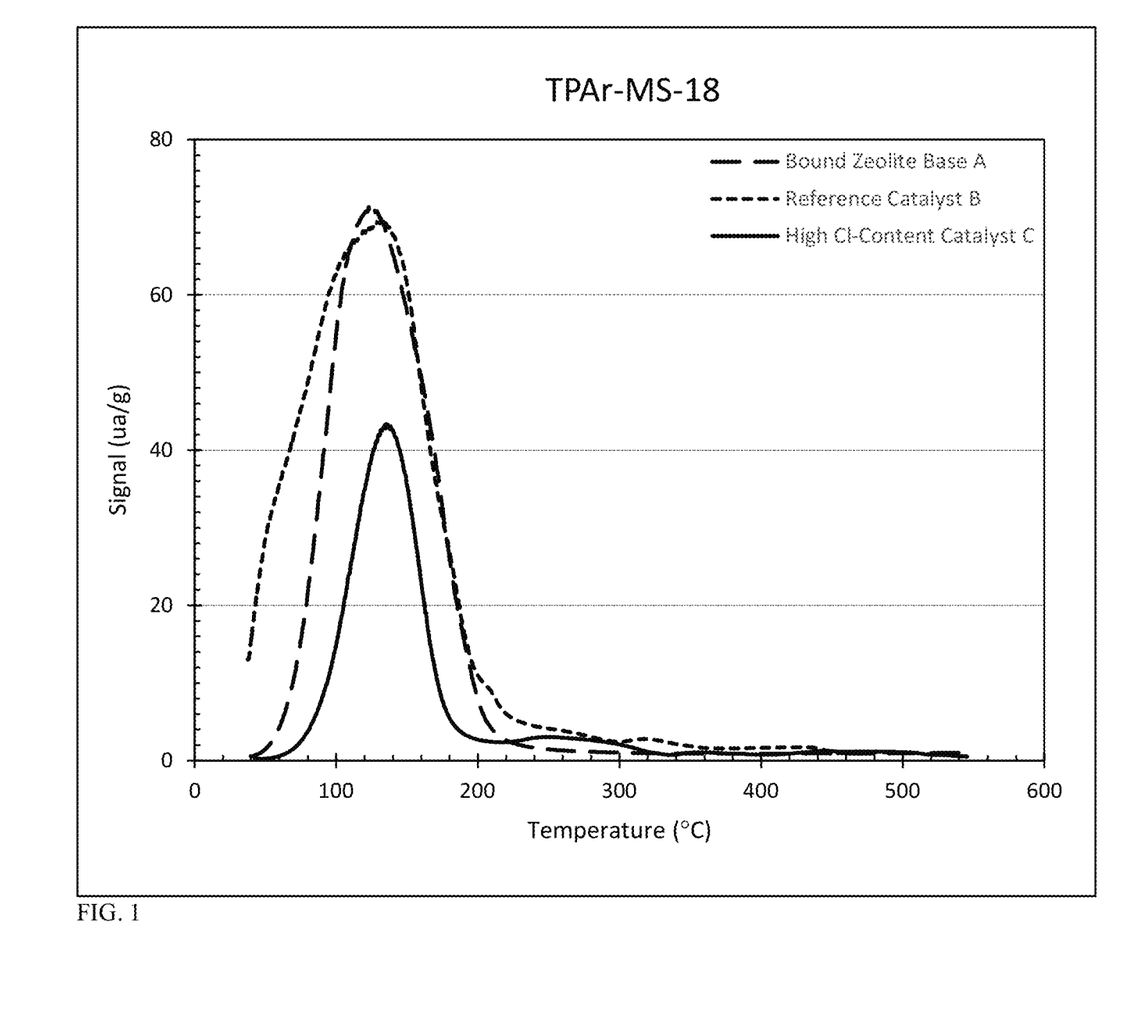
FIG. 1 presents a TPAr-MS-18 plot for bound zeolite base A, reference catalyst B, and high chlorine content catalyst C.
Figure 2:
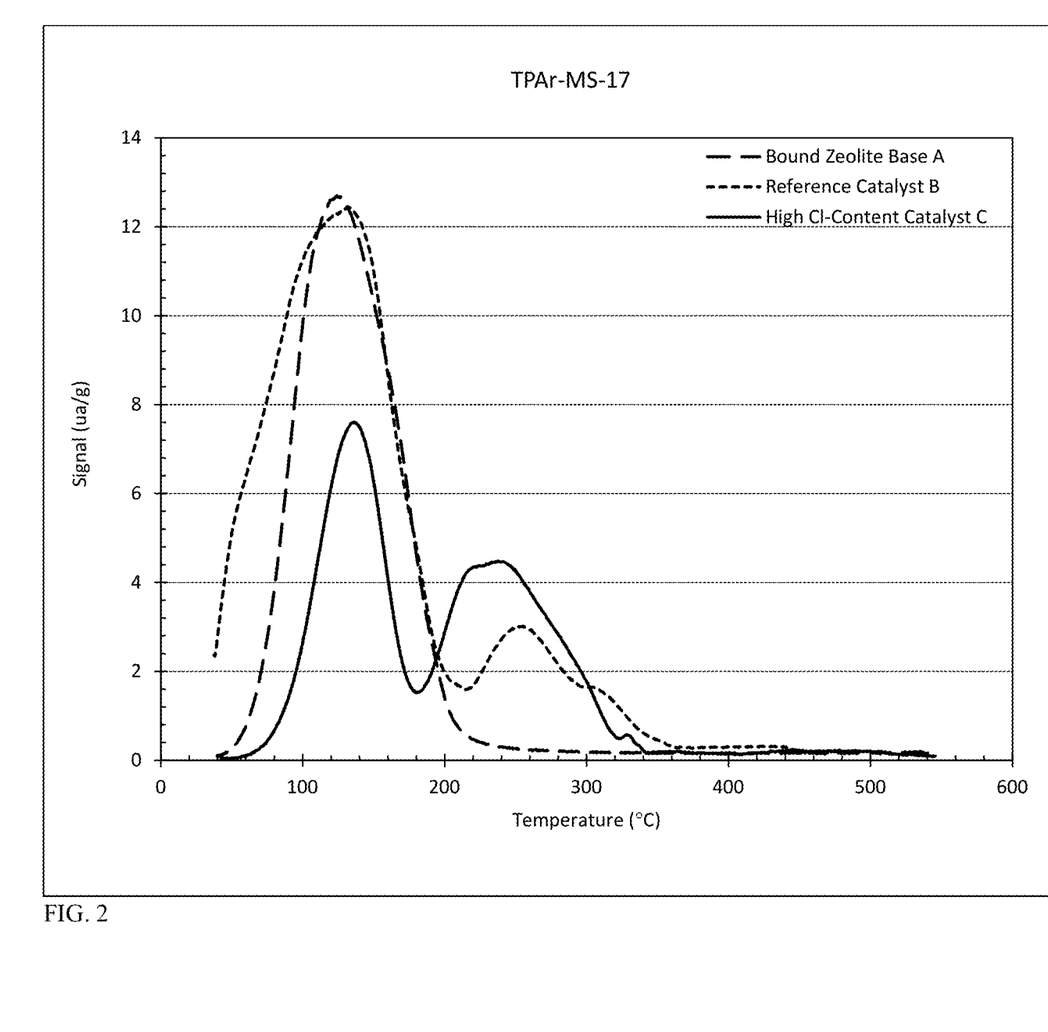
FIG. 2 presents a TPAr-MS-17 plot for bound zeolite base A, reference catalyst B, and high chlorine content catalyst C.
Figure 3:
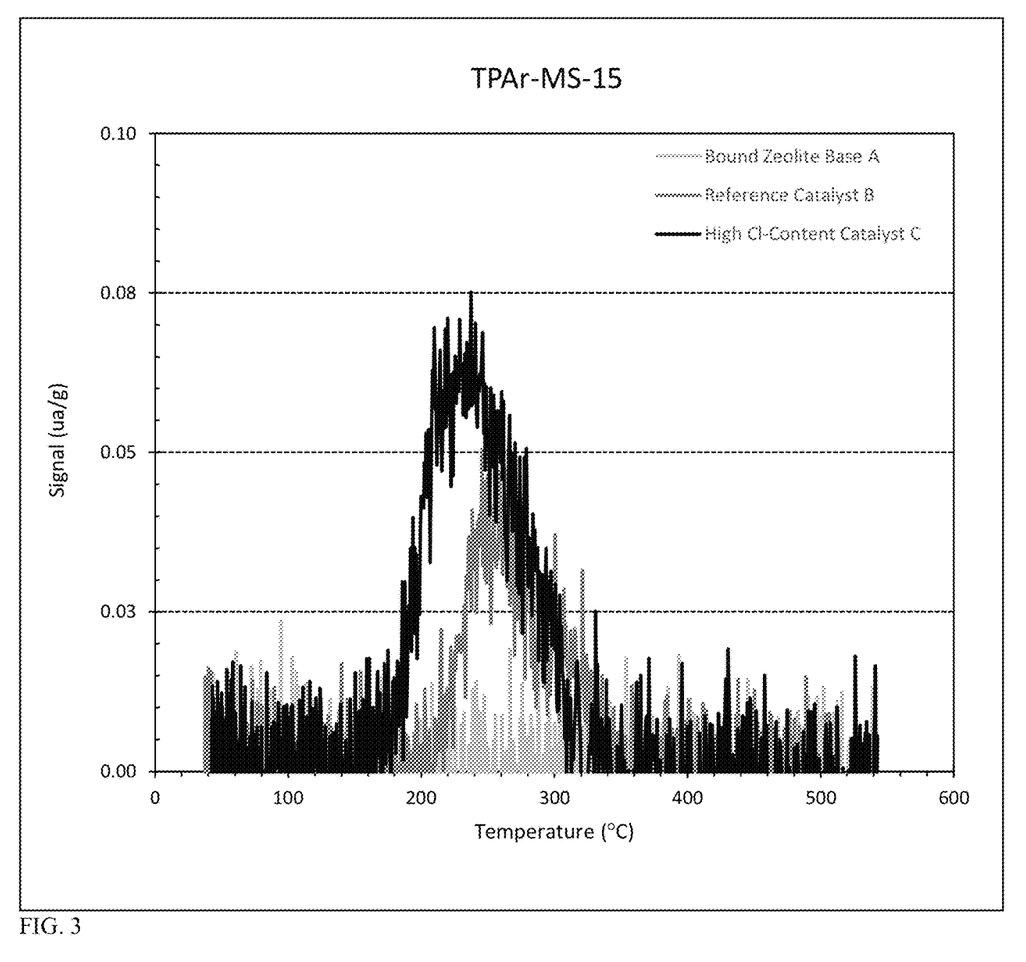
FIG. 3 presents a TPAr-MS-15 plot for bound zeolite base A, reference catalyst B, and high chlorine content catalyst C.

FIG. 1 is a TPAr-MS-18 plot, FIG. 2 is a TPAr-MS-17 plot, and FIG. 3 is a TPR-MS-15 for bound zeolite base A, reference catalyst B, and high chlorine content catalyst C. FIG. 1 demonstrates that moisture/water ($H_2O$) was removed from the base or from the catalyst in the temperature range of 150-430° F. (65-221° C.). The MS signal at mass 18 is nearly all due to water. There may be a very small possible contribution from the fragmentation of ammonium chloride, but it is likely that this would have been converted to ammonia after the drying and calcining steps during catalyst preparation. Therefore, under the conditions of the TPAr-MS-18, effectively all moisture/water was removed once the temperature of ~430° F. (~221° C.) was reached.

FIG. 2 demonstrates the important finding that nitrogen/ammonia ($NH_3$) is not removed nearly as easily as that of moisture/water ($H_2O$) from the catalyst. Since bound zeolite base A contained no nitrogen/ammonia, there is no $NH_3$ peak at mass 17 for the bound zeolite base in FIG. 2. Due to the ammonium present in the platinum, chlorine, and fluorine precursors used to prepare the aromatization catalyst, there was a significant amount of $NH_3$ remaining in the catalyst, even after the drying and calcining steps used during catalyst preparation. Notably, high chlorine content catalyst C contained a much greater amount of $NH_3$, as shown in FIG. 2, and nitrogen/ammonia ($NH_3$) was removed from the respective catalyst in the temperature range of 370-620° F. (188-327° C.). Therefore, under the conditions of the TPAr-MS-17, effectively all ammonia was removed once the temperature of ~620° F. (~327° C.) was reached. Note that for bound zeolite base A, reference catalyst B, and high chlorine content catalyst C, there is a water peak in the temperature range of 150-430° F. (65-221° C.) of FIG. 2. This is due to a small contribution to the MS-17 signal coming from water (approximately 18% of the water fragmentation results in a MS-17 signal).

FIG. 3 confirms that the peak in the temperature range of 370-620° F. (188-327° C.) in FIG. 2 is due to ammonia ($NH_3$) and not water. The signal in the TPR-MS-15 plot is from ammonia, because water does not have a mass 15 fragment. However, the mass 15 fragment from ammonia is only about 4% of the total ammonia fragmentation. FIG. 3 is consistent with the trends demonstrated in FIG. 2, but FIG. 3 is noisy due to the low population of mass 15 fragments from ammonia.

Examples 1-8

Supported aromatization catalyst Examples 1-2 were prepared similarly to that of reference catalyst B (approximately 1 wt. % Pt, 0.85 wt. % Cl, and 0.6 wt. % F), and catalyst Examples 3-8 were prepared similarly to high chlorine content catalyst C (approximately 1 wt. % Pt, 2.5 wt. % Cl, and 0.6 wt. % F). The supported aromatization catalysts were ground and sieved to about 20-40 mesh (US). To determine the impact of drying conditions on the supported catalysts of Examples 1-8, each catalyst was loaded into a 1-inch OD stainless steel reactor and contacted with a dry nitrogen gas stream (GHSV of 8000/hr; linear velocity of 0.24 m/sec) at 50 psig for 2 hr at the respective temperatures shown in Table I.

Then, 2 cc of the dried supported catalyst was placed in a ⅜-inch OD stainless steel reactor vessel in a temperature-controlled furnace. After reducing the supported catalyst under flowing molecular hydrogen (100%) at 521° C. for 1 hr, the reactor was cooled down to 371° C. and a feed stream of aliphatic hydrocarbons and molecular hydrogen was introduced to the reactor vessel at a pressure of 65 psig, a hydrogen:hydrocarbon molar ratio of 2:1, and a liquid hourly space velocity (LHSV) of 6 $hr^{-1}$. The aliphatic hydrocarbon feed contained approximately 0.61 mole fraction of convertible $C_6$ species and 0.21 mole fraction of convertible $C_7$ species. The balance was aromatics, $C_8$+, and non-convertible hydrocarbon. The reactor temperature was then adjusted to maintain a target of 75 wt. % aromatics in the $C_5^+$ fraction of the reactor effluent as determined by gas chromatography. The amounts of the numerous feedstock components and product components, including benzene and toluene present, also were recorded for selectivity calculations.

The temperature at the start of run ($T_{SOR}$) and the fouling rate (abbreviated FR, units of ° F./hr) of a supported catalyst sample were determined by plotting the temperature (yield adjusted catalyst temperature) required to maintain a total yield of aromatics (such as benzene and toluene) at 75 wt. % over time at the standard test conditions provided above. As used herein, the term "yield-adjusted temperature" refers to the catalyst bed temperature in a lab-scale reactor system which has been adjusted to account for samples taken when the reactor effluent does not contain 75 wt. % aromatics in the $C_5^+$ fraction of the reactor effluent. The adjustment factor (for example, in units of ° F./wt. %) was determined by prior experiments with similar supported catalysts. A linear regression analysis of the temperatures collected between 10 and 40 hr results in the formula, $T_{adj}=FR*t+T_{SOR}$, where $T_{adj}$ is the yield adjusted temperature, FR is the fouling rate, t is time, and $T_{SOR}$ is the Start of Run temperature (temperature needed to achieve 75 wt. % aromatics yield at a hypothetical time zero). The total time on stream was 40 hr, and the End of Run temperature (abbreviated $T_{EOR}$) at 40 hr also was determined; $T_{EOR}$ is the temperature needed to achieve 75 wt. % aromatics yield at the end of the 40-hr run. Initial low conversion and catalyst break-in conditions were the primary reasons that the temperatures prior to 10 hr were not included in the determination of $T_{SOR}$ and FR.

Figure 4:
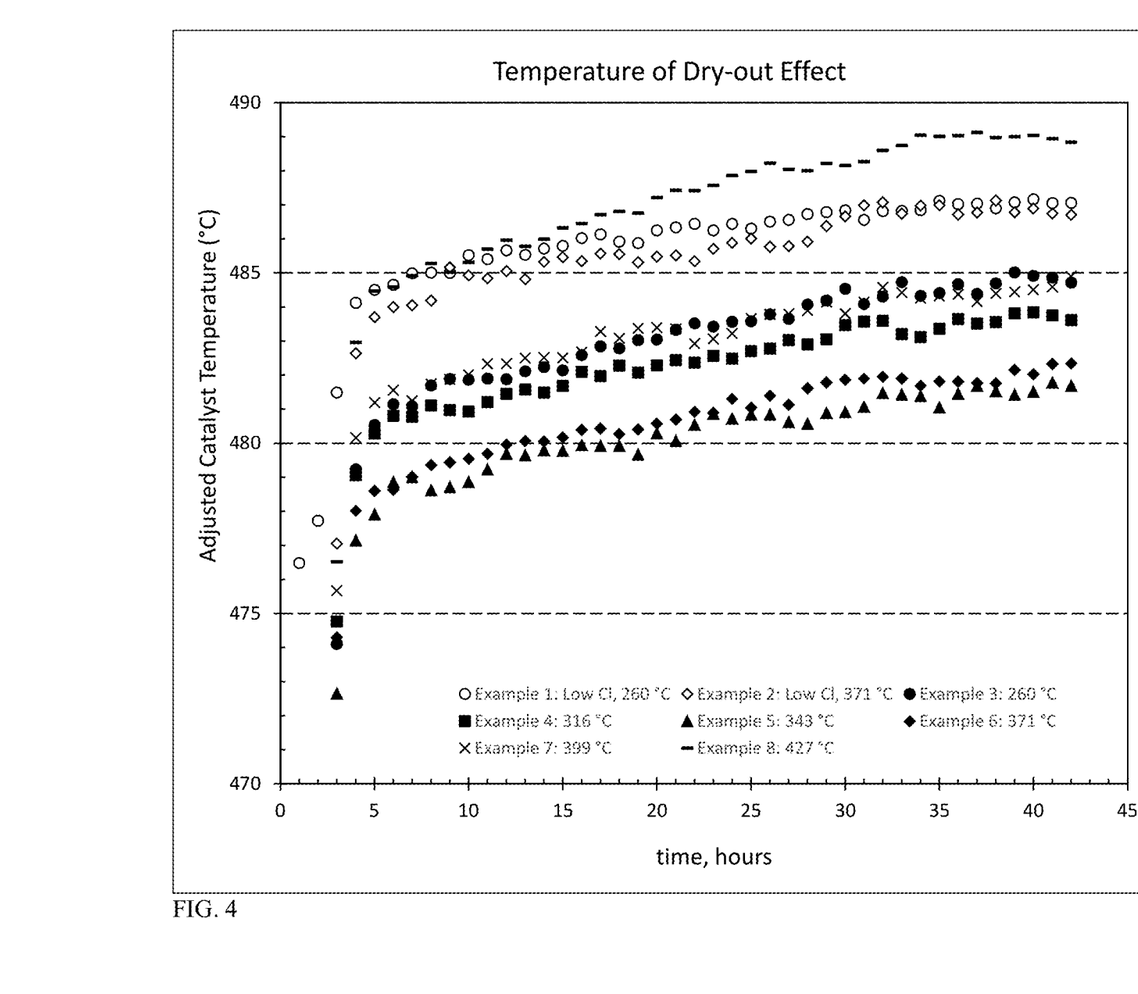
FIG. 4 presents a plot of the yield-adjusted temperature versus reaction time for the supported catalysts of Examples 1-8.
Figure 5:
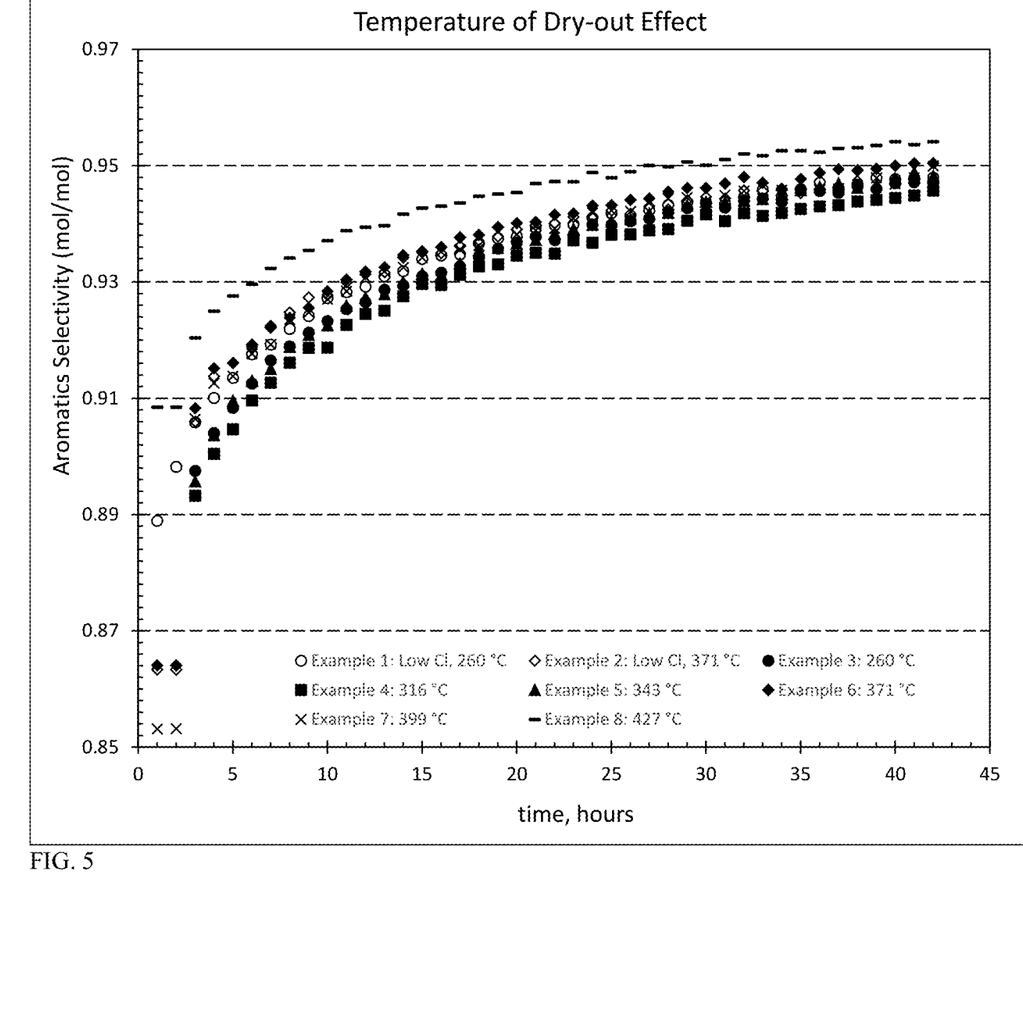
FIG. 5 presents a plot of the molar aromatics selectivity versus reaction time for the supported catalysts of Example 1-8.

FIG. 4 compares the yield-adjusted temperature versus reaction time for each supported catalyst of Examples 1-8 (lower temperature equates to higher catalyst activity), FIG. 5 compares the molar aromatics selectivity versus reaction time for each supported catalyst of Examples 1-8, and Table I summarizes certain data from these figures, as well as compositional and platinum dispersion attributes of the catalysts of Examples 1-8 after drying and before hydrogen reduction. Referring first to FIG. 5, the molar selectivity to aromatics was substantially the same for all of the catalysts, at around 94-95% (see also Table I).

Referring now to FIG. 4 and Table I, the reference (low chlorine) catalysts of Examples 1-2—despite drying Example 1 at 260° C. versus drying Example 2 at 371° C.—had virtually identical $T_{EOR}$, platinum dispersion, and Cl/F contents. There was less residual nitrogen on Example 2, but it is apparent that the different drying conditions had no impact on the catalyst performance of the reference (low chlorine) catalysts. Note that not all the nitrogen present on the catalysts is present as $NH_3$.

This was not the case, unexpectedly, for the high chlorine content catalysts of Examples 3-8. First, a higher temperature is not always better. Example 8, in which drying was performed at 426° C., had the worst catalyst activity (highest $T_{EOR}$), and the platinum dispersion at this elevated temperature was adversely impacted, as shown by FIG. 4 and Table I. Examples 4-6 all showed a surprising improvement in catalyst activity (lower $T_{EOR}$), and lower chlorine and nitrogen amounts, as compared to Example 3, even though Examples 4-6 had lower platinum dispersion values than Example 3. Interestingly, Examples 5-6 utilized drying temperatures of 343-371° C., which were above the 327° C. value shown in FIG. 2 for the removal of nitrogen/ammonia ($NH_3$), and Examples 5-6 had the best overall catalyst activity (lowest $T_{EOR}$).

TABLE I

Summary of Examples 1-8.

| Example - Drying Temperature | Cl (wt. %) | F (wt. %) | N (wt. %) | Platinum Dispersion (%) | $T_{EOR}$ (° F.) | Aromatics Selectivity (%) |
|---|---|---|---|---|---|---|
| 1 - 260° C. | 0.78 | 0.71 | 0.29 | 67 | 909 | 94 |
| 2 - 371° C. | 0.78 | 0.73 | 0.09 | 67 | 908 | 94 |
| 3 - 260° C. | 2.49 | 0.91 | 0.83 | 72 | 904 | 94 |
| 4 - 315° C. | 2.29 | 0.81 | 0.68 | 69 | 902 | 94 |
| 5 - 343° C. | 1.56 | 0.73 | 0.35 | 71 | 898 | 94 |
| 6 - 371° C. | 1.27 | 0.74 | 0.14 | 64 | 899 | 95 |
| 7 - 399° C. | 1.15 | 0.72 | 0.13 | 65 | 904 | 95 |
| 8 - 426° C. | 0.97 | 0.69 | 0.06 | 56 | 911 | 95 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process for activating a supported aromatization catalyst in a reactor system, the process comprising:
(a) contacting the supported aromatization catalyst with an inert gas stream in the reactor system at a drying temperature in a range from 300° C. to 400° C. to form a treated catalyst, the supported aromatization catalyst comprising:
a bound zeolite base;
from 0.3 wt. % to 3 wt. % of platinum;
from 1.8 wt. % to 4 wt. % of chlorine; and
from 0.4 wt. % to 1.5 wt. % of fluorine; and
(b) contacting the treated catalyst with a reducing gas stream in the reactor system to form an activated catalyst.

Aspect 2. A reforming process comprising:
(i) contacting a supported aromatization catalyst with an inert gas stream in a reactor system at a drying temperature in a range from 300° C. to 400° C. to form a treated catalyst, the supported aromatization catalyst comprising:
a bound zeolite base;
from 0.3 wt. % to 3 wt. % of platinum;
from 1.8 wt. % to 4 wt. % of chlorine; and
from 0.4 wt. % to 1.5 wt. % of fluorine:
(ii) contacting the treated catalyst with a reducing gas stream in the reactor system to form an activated catalyst; and
(iii) contacting a hydrocarbon feed with the activated catalyst under reforming conditions in the reactor system to produce an aromatic product.

Aspect 3. The process defined in aspect 1 or 2, wherein the process further comprises a step of cooling the treated catalyst after step (a) and before step (b) (or after step (i) and before step (ii)) to a temperature in any range disclosed herein, e.g., from 150° C. to 280° C., from 180° C. to 270° C., or from 200° C. to 260° C.

Aspect 4. The process defined in aspect 3, wherein the step of cooling the treated catalyst is performed in an inert gas, wherein the inert gas is the same as or different from the inert gas stream in step (a) (or step (i)).

Aspect 5. The process defined in aspect 3, wherein the step of cooling the treated catalyst is performed in a mixture of an inert gas and a reducing gas, e.g., hydrogen.

Aspect 6. The process defined in any one of the preceding aspects, wherein the drying temperature is in any range disclosed herein, e.g., from 315° C. to 385° C., from 330° C. to 375° C., or from 340° C. to 370° C.

Aspect 7. The process defined in any one of the preceding aspects, wherein step (a) or step (i) is conducted for any time period disclosed herein, e.g., from 1 hr to 72 hr, from 3 hr to 72 hr, from 2 hr to 48 hr, from 2 hr to 24 hr, or from 6 hr to 36 hr.

Aspect 8. The process defined in any one of the preceding aspects, wherein the inert gas stream comprises any inert gas disclosed herein, e.g., helium, neon, argon, nitrogen, or a combination thereof.

Aspect 9. The process defined in any one of the preceding aspects, wherein step (b) or step (ii) is conducted at a peak reducing temperature in any range disclosed herein, e.g., from 200° C. to 600° C., from 250° C. to 550° C., from 450° C. to 525° C., or from 500° C. to 550° C.

Aspect 10. The process defined in any one of the preceding aspects, wherein step (b) or step (ii) is conducted for any time period disclosed herein, e.g., from 1 hr to 72 hr, from 3 hr to 72 hr, from 2 hr to 48 hr, from 2 hr to 24 hr, or from 6 hr to 36 hr.

Aspect 11. The process defined in any one of the preceding aspects, wherein the reducing gas stream comprises any reducing gas composition disclosed herein, e.g., molecular hydrogen, molecular hydrogen and an inert gas, or molecular hydrogen and nitrogen, and at any relative amount of hydrogen in the reducing gas stream (e.g., from 10 to 100 vol %, from 10 to 75 vol %, or from 45 to 75 vol %).

Aspect 12. The process defined in any one of the preceding aspects, wherein step (a) and step (b) (or step (i) and step (ii)) are conducted independently at any pressure disclosed herein, e.g., atmospheric pressure, from 0 psig to 100 psig, from 5 psig to 75 psig, or from 10 psig to 50 psig.

Aspect 13. The process defined in any one of the preceding aspects, wherein the supported aromatization catalyst comprises any weight percentage of chlorine disclosed herein, e.g., from 2 wt. % to 3.8 wt. %, from 2.2 wt. % to 3.6 wt. %, from 2.2 wt. % to 3.4 wt. %, from 2.2 wt. % to 3 wt. %, or from 2.5 wt. % to 3.3 wt. % chlorine.

Aspect 14. The process defined in any one of the preceding aspects, wherein the supported aromatization catalyst comprises any weight percentage of fluorine disclosed herein, e.g., from 0.5 wt. % to 1.3 wt. %, from 0.5 wt. % to 1.1 wt. %, or from 0.6 wt. % to 0.9 wt. % fluorine.

Aspect 15. The process defined in any one of the preceding aspects, wherein the supported aromatization catalyst (or the treated catalyst, or the activated catalyst) comprises any weight percentage of platinum disclosed herein, e.g., from 0.5 wt. % to 2.5 wt. %, from 0.5 wt. % to 2 wt. %, or from 0.7 wt. % to 1.5 wt. % platinum.

Aspect 16. The process defined in any one of the preceding aspects, wherein the bound zeolite base (or the supported aromatization catalyst, or the treated catalyst, or the activated catalyst) comprises a zeolite and a binder.

Aspect 17. The process defined in aspect 16, wherein the bound zeolite base (or the supported aromatization catalyst, or the treated catalyst, or the activated catalyst) comprises any weight percentage of binder disclosed herein, e.g., from 3 wt. % to 35 wt. %, or from 5 wt. % to 30 wt. % binder, based on the total weight of the bound zeolite base (or the respective catalyst).

Aspect 18. The process defined in aspect 16 or 17, wherein the binder comprises alumina, silica, magnesia, boria, titania, zirconia, a mixed oxide thereof, or a combination thereof.

Aspect 19. The process defined in aspect 16 or 17, wherein the binder comprises silica.

Aspect 20. The process defined in any one of the preceding aspects, wherein the bound zeolite base (or the supported aromatization catalyst, or the treated catalyst, or the activated catalyst) comprises a bound L-zeolite.

Aspect 21. The process defined in any one of aspects 1-19, wherein the bound zeolite base (or the supported aromatization catalyst, or the treated catalyst, or the activated catalyst) comprises a bound K/L-zeolite.

Aspect 22. The process defined in any one of aspects 1-19, wherein the bound zeolite base (or the supported aromatization catalyst, or the treated catalyst, or the activated catalyst) comprises a silica-bound K/L-zeolite.

Aspect 23. The process defined in any one of the preceding aspects, wherein the supported aromatization catalyst comprises any weight ratio of chlorine:fluorine disclosed herein, e.g., from 1.5:1 to 8:1, from 2:1 to 5:1, or from 3:1 to 4.5:1.

Aspect 24. The process defined in any one of the preceding aspects, wherein the supported aromatization catalyst (or the treated catalyst, or the activated catalyst) is substantially free of barium, e.g., contains less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of barium, based on the weight of the respective catalyst.

Aspect 25. The process defined in any one of the preceding aspects, wherein the supported aromatization catalyst (or the treated catalyst, or the activated catalyst) is substantially free of transition metals other than platinum, e.g., contains less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm; from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of transition metals other than platinum, based on the weight of the respective catalyst.

Aspect 26. The process defined in any one of the preceding aspects, wherein the supported aromatization catalyst (or the treated catalyst, or the activated catalyst) is substantially free of sulfur, e.g., contains less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of sulfur, based on the weight of the weight of the respective catalyst.

Aspect 27. The process defined in any one of the preceding aspects, wherein the inert gas stream, or the reducing gas stream, or both is/are substantially free of water/moisture, e.g., contain(s) less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of water/moisture, based on the weight of the respective gas stream.

Aspect 28. The process defined in any one of the preceding aspects, wherein the inert gas stream, or the reducing gas stream, or both, is/are substantially free of oxygen, e.g., contain(s) less than or equal to 750 ppm: less than or equal to 500 ppm: less than or equal to 100 ppm: less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of oxygen, based on the weight of the respective gas stream.

Aspect 29. The process defined in any one of the preceding aspects, wherein the inert gas stream, or the reducing gas stream, or both is/are substantially free of sulfur, e.g., contain(s) less than or equal to 750 ppm: less than or equal to 500 ppm: less than or equal to 100 ppm; less than or equal to 50 ppm: less than or equal to 25 ppm: less than or equal to 5 ppm: from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of sulfur, based on the weight of the respective gas stream.

Aspect 30. The process defined in any one of the preceding aspects, wherein the inert gas stream is substantially free of molecular hydrogen, e.g., contains less than or equal to 750 ppm: less than or equal to 500 ppm; less than or equal to 100 ppm: less than or equal to 50 ppm: less than or equal to 25 ppm: less than or equal to 5 ppm; from greater than zero to 750 ppm, 500 ppm, 100 ppm, 50 ppm, 25 ppm, or 5 ppm: from 0.1 ppm to 750 ppm, 500 ppm, 100 ppm, 50 ppm, 25 ppm, or 5 ppm; or from 2 ppm to 750 ppm, 500 ppm, 100 ppm, 50 ppm, 25 ppm, or 5 ppm: of molecular hydrogen, based on the weight of the weight of the inert gas stream.

Aspect 31. The process defined in any one of the preceding aspects, wherein the hydrocarbon feed is substantially free of sulfur, e.g., contains less than or equal to 750 ppm; less than or equal to 100 ppm: less than or equal to 50 ppm: less than or equal to 25 ppm: less than or equal to 5 ppm: from greater than zero to 750 ppm, 100 ppm, 50 ppm, 25 ppm, or 5 ppm: from 0.1 ppm to 750 ppm, 100 ppm, 50 ppm, 25 ppm, or 5 ppm; or from 2 ppm to 750 ppm, 100 ppm, 50 ppm, 25 ppm, or 5 ppm: of sulfur, based on the weight of the hydrocarbon feed.

Aspect 32. The process defined in any one of the preceding aspects, wherein the treated catalyst or the activated catalyst comprises any weight percentage of chlorine disclosed herein, e.g., from 0.30 wt. % to 2.3 wt. %, from 0.30 wt. % to 2 wt. %, or from 0.35 wt. % to 1.7 wt. % chlorine, based on the total weight of the respective catalyst.

Aspect 33. The process defined in any one of the preceding aspects, wherein the treated catalyst or the activated catalyst comprises any weight percentage of nitrogen disclosed herein, e.g., from 0.05 wt. % to 0.7 wt. %, from 0.1 wt. % to 0.6 wt. %, or from 0.1 wt. % to 0.5 wt. % nitrogen, based on the total weight of the respective catalyst.

Aspect 34. The process defined in any one of the preceding aspects, wherein the treated catalyst or the activated catalyst is characterized by a platinum dispersion in any range disclosed herein, e.g., from 60% to 80%, from 62% to 75%, or from 62% to 72%.

Aspect 35. The process defined in any one of the preceding aspects, wherein the activated catalyst is characterized by a $T_{EOR}$ less than that of an otherwise identical catalyst in which step (a) or step (i) is performed at a temperature of less than 275° C., under the same aromatization reaction conditions.

Aspect 36. The process defined in any one of the preceding aspects, wherein the activated catalyst is characterized by a $T_{SOR}$ less than that of an otherwise identical catalyst in which step (a) or step (i) is performed at a temperature of less than 275° C., under the same aromatization reaction conditions.

Aspect 37. The process defined in any one of aspects 2-36, wherein the activated catalyst is not contacted with an inert gas composition or a non-reducing gas composition at a temperature above 400° C., above 500° C., or from 535° C. and 750° C., between step (ii) and step (iii).

Aspect 38. The process defined in any one of aspects 2-37, wherein the hydrocarbon feed is any hydrocarbon feed disclosed herein, e.g., comprising alkanes and cycloalkanes, comprising $C_6$-$C_9$ alkanes and/or cycloalkanes, or comprising $C_6$-$C_8$ alkanes and/or cycloalkanes.

We claim:

1. A reforming process comprising:
   (i) contacting a supported aromatization catalyst with an inert gas stream in a reactor system at a drying temperature in a range from 300° C. to 400° C. to form a treated catalyst, the supported aromatization catalyst comprising;
   a bound zeolite base;
   from 0.3 wt. % to 3 wt. % of platinum;
   from 1.8 wt. % to 4 wt. % of chlorine; and
   from 0.4 wt. % to 1.5 wt. % of fluorine;
   (ii) contacting the treated catalyst with a reducing gas stream in the reactor system to form an activated catalyst; and
   (iii) contacting a hydrocarbon feed with the activated catalyst under reforming conditions in the reactor system to produce an aromatic product.

2. The process of claim 1, wherein the process further comprises a step of cooling the treated catalyst after step (i) and before step (ii) to a temperature in a range from 150° C. to 280° C.

3. The process of claim 2, wherein the step of cooling the treated catalyst is performed in an inert gas.

4. The process of claim 2, wherein the step of cooling the treated catalyst is performed in a mixture of an inert gas and a reducing gas.

5. The process of claim 1, wherein:
   the bound zeolite base comprises a silica-bound K/L-zeolite; and
   the supported aromatization catalyst comprises:
   from 0.5 wt. % to 2.5 wt. % of platinum;
   from 2.2 wt. % to 3.6 wt. % of chlorine; and
   from 0.5 wt. % to 1.3 wt. % of fluorine.

6. The process of claim 1, wherein the hydrocarbon feed comprises $C_6$-$C_8$ alkanes and/or cycloalkanes.

7. The process of claim 1, wherein:
   the inert gas stream comprises nitrogen; and
   the drying temperature is in a range from 315° C. to 385° C.

8. The process of claim 1, wherein:
   the reducing gas stream comprises molecular hydrogen; and
   step (ii) is conducted at a peak reducing temperature in a range from 200° C. to 600° C.

9. The process of claim 1, wherein the treated catalyst comprises:
   from 0.30 wt. % to 2.3 wt. % chlorine; and
   from 0.05 wt. % to 0.7 wt. % nitrogen.

10. The process of claim 1, wherein:
    the activated catalyst is characterized by a $T_{EOR}$ less than that of an otherwise identical catalyst in which step (i) is performed at a temperature of less than 275° C., under the same aromatization reaction conditions; and
    the activated catalyst is characterized by a $T_{SOR}$ less than that of an otherwise identical catalyst in which step (i) is performed at a temperature of less than 275° C., under the same aromatization reaction conditions.

11. The process of claim 1, wherein the hydrocarbon feed contains less than or equal to 750 ppm of sulfur, based on the weight of the hydrocarbon feed.

* * * * *